(No Model.)
J. W. SUTTON.
ROTARY APPARATUS FOR GENERATION OF CHLORIN GAS, &c.
No. 527,899. Patented Oct. 23, 1894.
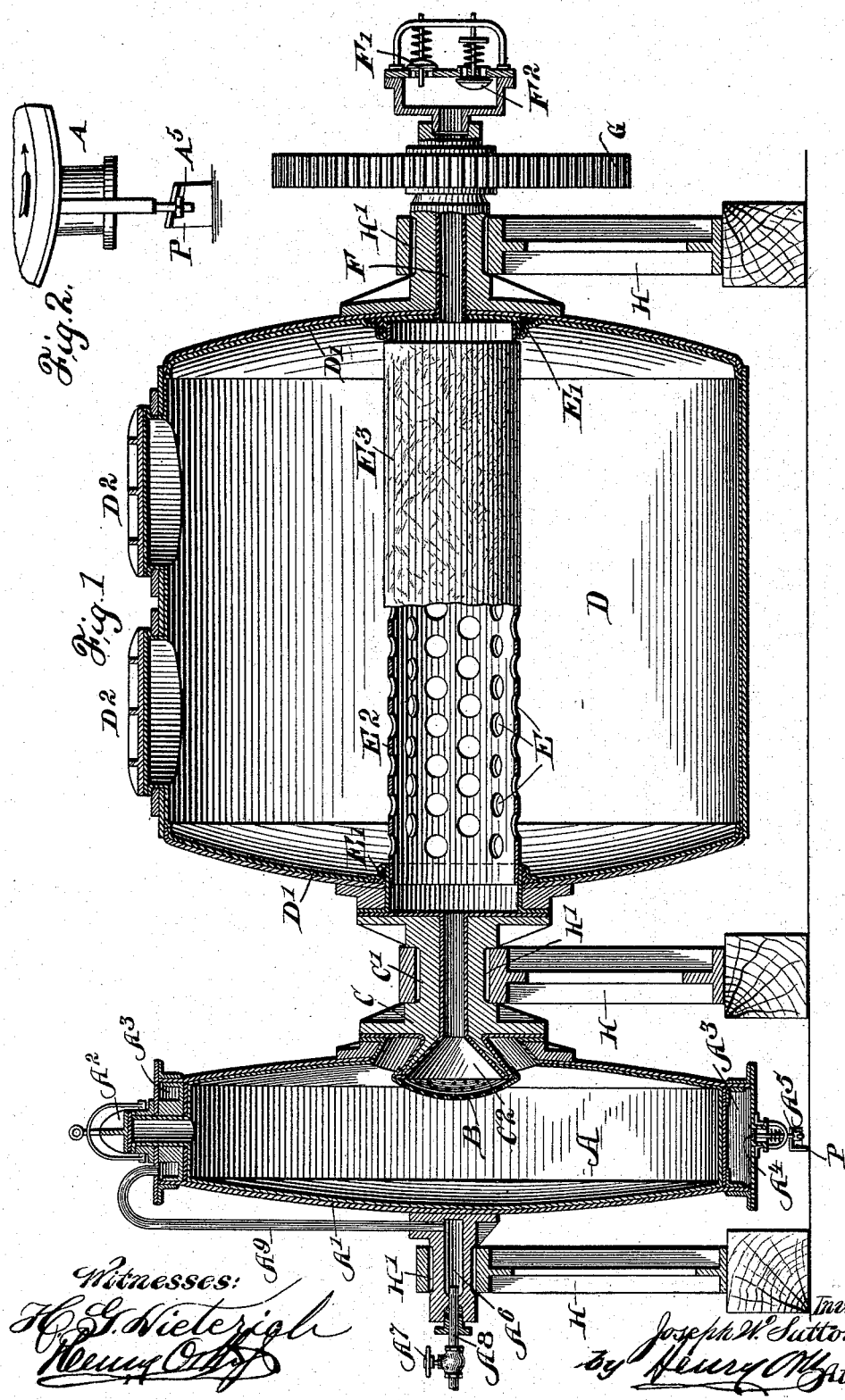

UNITED STATES PATENT OFFICE.

JOSEPH WILLIAM SUTTON, OF CHELMER, QUEENSLAND.

ROTARY APPARATUS FOR GENERATION OF CHLORIN GAS, &c.

SPECIFICATION forming part of Letters Patent No. 527,899, dated October 23, 1894.

Application filed February 1, 1894. Serial No. 498,708. (No model.)

*To all whom it may concern:*

Be it known that I, JOSEPH WILLIAM SUTTON, a subject of the Queen of Great Britain, and a resident of Chelmer, in the county of Stanley and Colony of Queensland, have invented a certain new and useful improved rotary apparatus to be used in the generation of chlorin gas and its application to the chlorination of finely divided auriferous material and silver ores, of which the following is a specification.

My invention relates to the generation of chlorine gas, and to the connection between the generating and chlorinating chambers for the passage of the gas and to the admission of the gas to the gold or silver ore within the chlorinating chamber. Hitherto in producing chlorine gas chemically it has been obtained either by adding the necessary chemicals to the ore in the chlorinating vessel or the chlorine has been generated in a separate vessel and conveyed to the chlorinating vessel in pipes or stored in gasholders until required. In both cases a very considerable waste of chlorine is caused either by over-production or leakage.

Now the object of my invention is to provide compact apparatus in which the production of the gas can be rapidly and economically effected while it has no moving joints for leakage between the generating and chlorinating chambers, also, in which the admission of the gas to the ore within the chlorinating chamber may be effectively carried out.

My improved apparatus consists essentially of a rotary generator which is charged with the necessary chemicals for the production of the chlorine and is surrounded by a steam jacket for assisting in the evolution of the gas. Within the generator is a perforated rose or funnel shaped outlet being portion of a casting which forms a journal connecting the generating and chlorinating chambers. The journal contains a passage for the gas to the chlorinating chamber which is provided axially with a perforated leaden cylinder or tube leading from the hollow journal. The leaden tube is covered with asbestos cloth which permits the free admission of gas to the ore and prevents any particles of ore passing through to the tube. Provision is made for the regulation of the pressure within the chlorinating chamber, and for the admission of steam to the steam jacket and escape of the water of condensation therefrom.

Motion is imparted to the apparatus by means of a toothed wheel and gearing.

In order that my invention may be clearly understood I will now describe same with reference to the accompanying drawings, in which—

Figure 1 represents a central sectional elevation of my apparatus, and Fig. 2 is a detail elevation of a portion of the chlorine generator and the plate for actuating the valve of the steam jacket.

A is the generating chamber having a lead or other acid resisting lining $A'$.

$A^2$ is a door for charging generator.

$A^3$ is a steam jacket.

A is a valve arrangement having a tappet $A^5$ which at each revolution of the rotary chamber A comes into contact with a plate P (Fig. 2) and opens valve $A^4$ and allows the escape of any water of condensation in jacket $A^3$.

$A^8$ is a steam pipe.

$A^6$ is a hollow journal for passage of steam which is regulated by means of cock $A^7$, and $A^9$, pipe that connects hollow journal with steam jacket $A^3$.

B is a perforated rose or funnel shaped outlet for the gas, being portion of a casting C which also forms the journal $C'$ connecting the generating and chlorinating chambers and having a passage $C^2$ for the gas.

D is a rotary chlorinating chamber of wood or iron and provided with a lead or other acid resisting lining $D'$.

$D^2$, $D^2$ are charging or discharging doors for the ore.

$E^2$ is a leaden tube or cylinder secured axially in the chamber D by means of flanged rings $E'$ and having perforations E and covered with asbestos cloth $E^3$.

F is a hollow journal for escape of gas through outlet valve $F'$ when pressure within chamber D becomes too great and also for ingress of air through inlet valve $F^2$ to prevent formation of a vacuum in chamber D.

G is a toothed wheel connected to gearing (not shown) for the purpose of rotating the apparatus.

H are supports or standards for apparatus and $H'$ bearings.

All parts of the apparatus exposed to the action of chlorine or acid are provided with a lead or other acid resisting lining.

The operation of my apparatus is as follows:—The chemicals for the production of the chlorine (preferably sodium chloride peroxide of manganese and sulphuric acid) are charged into chamber A through door $A^2$, in proportion to the quantity of gold or silver estimated in the ore, and steam is turned on through cock $A^7$ to jacket $A^3$ to assist in the evolution of the gas. Meanwhile the pulverized ore in a semi dry state, is charged into chlorinating chamber D through doors $D^2$ until it is about full. The apparatus is then rotated by means of toothed wheel G and gearing at the rate of about four to six revolutions per minute. The chemicals in chamber A being continually turned over the chlorine is rapidly given off and passing through the perforations on B, hollow journal $C'$, perforations E, and asbestos cloth $E^3$ permeates throughout the ore, and dissolves the gold or silver therein. As the chamber D is not quite full, its rotation causes a constant breaking up of the ore and thus assists the gas to reach each particle.

When the ore has been sufficiently chlorinated depending on the fineness of the gold or silver particles, the contents of the chlorinator are discharged and treated for the recovery of the gold or silver by any of the known methods.

Having thus described my invention, what I claim, and desire to secure by patent, is—

1. In combination, a chlorinator, a chlorine generator, a tubular axis of rotation common to both, the bore of said axis communicating with said chlorinator and generator and a valve casing at one end of said axis of rotation in communication with the bore thereof, for the purpose set forth.

2. In combination, a chlorinator, a chlorine generator, a tubular revoluble shaft common to both, the bore of said shaft communicating with said chlorinator and generator, a valve casing at one end of the shaft in communication with its bore and provided with inlet and outlet ports, valves for said ports, and springs adapted to hold the valves to their seats, substantially as and for the purpose set forth.

3. In combination, a chlorinator and a chlorine generator revoluble about a common axis, said generator provided with a steam jacket, a portion of said hollow axis being open to the generator and chlorinator respectively, and a pipe connecting the steam jacket of said generator with another portion of said hollow axis, for the purpose set forth.

4. In combination, a chlorinator and a chlorine generator revoluble about a common hollow axis having a funnel shaped inlet opening into the generator, that portion of said axis within the chlorinator being of increased diameter and provided with perforations, for the purpose set forth.

5. In combination, a chlorinator and a chlorine generator revoluble about a common hollow axis having a funnel shaped inlet opening into the generator, that portion of said axis within the chlorinator being of increased diameter and provided with perforations, and a gas distributer, as a foraminous covering not affected by chlorine encompassing the said perforated portion of the axis, for the purpose set forth.

6. In combination, a chlorinator and a chlorine generator revoluble about a common hollow axis having a funnel shaped inlet opening into the generator, and a covering of a foraminous material not affected by chlorine for the said inlet, that portion of said axis within the chlorinator being of increased diameter and provided with perforations, and a gas distributer as a foraminous covering not affected by chlorine encompassing the said perforated portion of the axis, for the purpose set forth.

7. In combination, a chlorinator, a chlorine generator revoluble together about a horizontal axis, said generator provided with a steam jacket, an exhaust valve normally closing a portion of said jacket, and means for automatically opening and reclosing said valve, for the purposes set forth.

8. In combination, a chlorinator, a chlorine generator revoluble together about a horizontal axis, said generator provided with a peripheral steam jacket, a spring actuated valve normally closing an exhaust port in the outer wall of said jacket, and means for moving the valve against the stress of its spring to temporarily open the exhaust port when said port is at its lowest point during the rotation of the generator, for the purpose set forth.

In witness whereof I have hereunto set my hand in presence of two witnesses.

JOSEPH WILLIAM SUTTON.

Witnesses:
CHARLES EDWARD GRAHAM,
21 *Queen Street, Brisbane, Patent Agent.*
JOHN THOMAS GRAHAM,
*Eagle St., Brisbane, Clerk.*